United States Patent [19]

Balloni et al.

[11] Patent Number: 5,057,177

[45] Date of Patent: * Oct. 15, 1991

[54] LAMINATED PACKAGING FILM

[75] Inventors: Ricardo Balloni, Fairport; A. Michael Nahmias, Victor, both of N.Y.

[73] Assignee: Mobil Oil Corporation, Fairfax, Va.

[*] Notice: The portion of the term of this patent subsequent to Oct. 9, 2007 has been disclaimed.

[21] Appl. No.: 540,541

[22] Filed: May 25, 1990

Related U.S. Application Data

[63] Continuation of Ser. No. 296,639, Jan. 13, 1989.

[51] Int. Cl.$^5$ ................................................. B32B 5/16
[52] U.S. Cl. ............................... 156/244.11; 156/289; 428/332; 428/349; 428/448; 428/461; 428/516
[58] Field of Search ........................... 156/289, 244.11; 428/332, 349, 448, 461, 516

[56] References Cited

U.S. PATENT DOCUMENTS

| | | | |
|---|---|---|---|
| 3,176,021 | 3/1965 | Volugis et al. | 260/32.6 |
| 4,211,811 | 7/1980 | Bordini et al. | 428/220 |
| 4,230,767 | 10/1980 | Isaka et al. | 428/349 |
| 4,293,608 | 10/1981 | Isaka et al. | 428/220 |
| 4,419,411 | 12/1983 | Park | 428/516 |
| 4,565,739 | 1/1986 | Clauson et al. | 428/349 |
| 4,604,324 | 8/1986 | Nahmias | 428/349 |
| 4,652,489 | 3/1987 | Crass et al. | 428/337 |
| 4,659,612 | 4/1987 | Balloni et al. | 428/213 |
| 4,690,856 | 9/1987 | Ito et al. | 428/448 X |
| 4,692,379 | 9/1987 | Keung et al. | 428/349 |
| 4,720,420 | 1/1988 | Crass et al. | 428/216 |
| 4,734,317 | 3/1988 | Bothe et al. | 428/215 |
| 4,764,425 | 8/1988 | Balloni et al. | 428/331 |
| 4,956,241 | 9/1990 | Chu et al. | 156/244.11 X |
| 4,961,992 | 10/1990 | Balloni et al. | 156/244.11 X |

FOREIGN PATENT DOCUMENTS 2030927  4/1980  United Kingdom ............... 428/349

*Primary Examiner*—David A. Simmons
*Assistant Examiner*—J. Sells
*Attorney, Agent, or Firm*—Alexander J. McKillop; Charles J. Speciale

[57] ABSTRACT

A polymer film laminate is provided having improved machinability on modern high speed belt drive machines, particularly when these machines are set up to form lap back seals. A method of assembling such a film is also provided. The film includes an outside web having an upper surface layer containing a silicon oil. This laminating web can be used with virtually any co-laminate, metallized or not, which is bonded thereto with an adhesive. Upon winding the composite film laminate upon a core, silicone oil is transferred to the inside surface of the laminate, thus providing an inside coefficient friction which is about equal to or less than the outside coefficient of friction. Hot slip properties are also improved upon such transfer. The outside and inside webs are independently formed, which allows the inside web to include coatings or film layers which are not ordinarily usable in a silicone oil-containing film.

15 Claims, No Drawings

LAMINATED PACKAGING FILM

This is a continuation of copending application Ser. No. 296,639, filed on Jan. 13, 1989.

BACKGROUND OF THE INVENTION

The field of the invention relates to films for packaging foodstuffs and other articles.

Certain films, though having excellent properties such as transparency, stiffness, and moisture barrier, have unacceptably high coefficients of friction which makes them difficult to utilize in automatic packaging equipment. Highly crystalline polypropylene film is one such film having the above-mentioned properties.

A number of approaches have been taken to improve the surface friction characteristics of films, including polypropylene films. One such approach is described in U.S. Pat. No. 3,176,021, and involves the inclusion of minor quantities of fatty acid amides into the polypropylene. U.S. Pat. No. 4,419,411, which is incorporated by reference herein, discloses a film having a base layer comprising polypropylene of high stereoregularity, the precursor resin of which contains an amide of a water-insoluble monocarboxylic acid, and a poly-olefin skin layer containing finely divided silica and a silicone oil. Some of the amide within the base layer blooms to the skin layer, thereby reducing the coefficient of friction to 0.25 or less at a temperature up to about 140° F.

The use of various silicone oils has been found to provide satisfactory reductions in the coefficients of friction of a variety of films, thereby facilitating their use in automatic packaging machines. U.S. Pat. Nos. 4,652,489, 4,659,612, 4,692,379, 4,720,420, 4,734,317 and 4,764,425, which are incorporated by reference herein, all disclose sealable films which employ polydialkylsiloxane as a slip agent. U.S. Pat. Nos. 4,659,612, 4,692,379 and 4,734,317 provide methods for reducing the coefficient of friction of both sides of a film laminate by adding a silicone oil such as polydimethylsiloxane to one surface layer thereof, and then contacting this surface layer to the second surface layer of the film to transfer some of the oil thereto. The second layer may be corona or flame treated to enhance its receptivity to water-based coatings such as certain inks and adhesives prior to the application of the silicone oil.

Films having a layer incorporating polydialkylsiloxane are relatively difficult to treat using conventional methods, and the bond strengths of such films when laminated may also be unacceptably low. Corona or flame treating a film surface layer containing such a silicone oil reduces the heat sealability thereof and increases the coefficient of friction. The benefits of the silicone oil are accordingly lost. Metallized coatings applied to such a surface layer may not tend to adhere as well to such surface layers as compared to surfaces devoid of silicone oil.

SUMMARY OF THE INVENTION

It is an object of the invention to provide a film having excellent bond strength and surface friction characteristics.

It is another object of the invention to provide a method for manufacturing such a film in an efficient manner using conventional equipment.

A still further object of the invention is to provide a method which allows great flexibility in combining film layers having selected properties, is sealable on both the inner and outer skin layers, has excellent bond strength, and has excellent slip characteristics on both surfaces.

In accordance with these and other objects of the invention, a laminated film is provided including first and second webs, the first web including a core layer and a surface layer, the surface layer of the first web containing an effective amount of polydialkylsiloxane to reduce the coefficient of friction thereof, and an adhesive layer bonding the first and second webs to each other. The surface or skin layers of each web are sealable, and preferably heat sealable. Polydialkylsiloxane is transferred from the skin layer of the first web to the skin layer of the second web in order to reduce the coefficient of friction thereof.

The method according to the invention includes the steps of providing a first web including a core layer and a skin layer, the skin layer containing a silicone oil such as polydialkylsiloxane, providing a second web, applying an adhesive between said first and second webs to bond them together, and contacting the skin layer of the first web to the exposed surface of the second web, thereby transferring silicone oil thereto.

The surface of the first web which is adhered to the second web may be treated so that it is receptive to ink. The bonding of the second web to the first web thereby locks in any printing on this surface so that it cannot be damaged in a packaging operation.

DETAILED DESCRIPTION OF THE INVENTION

A laminated film is provided which includes an outside web, an inside web, an adhesive layer bonding the webs to each other, one of the webs including a surface layer containing a silicone oil, the other of the webs including a surface layer substantially devoid of silicone oil except for oil which is transferred by contact of the surface layer of the one web therewith. The outer surfaces of the laminated film are preferably heat sealable. Such a laminated film can be used for packaging foodstuffs and the like in either belt-driven or non-belt-driven packaging machines and regardless of whether fin or lap seals are formed thereby.

When polyolefin films are formed into bags or sacks for receiving articles, the outer surfaces thereof can become scratched if the coefficient of friction is relatively high at the temperature at which such bags are constructed. The excessive drag which may cause such scratching may also cause the packaging apparatus to jam. Due to the advent of belt-driven packaging apparatus including an inside shaping tube which allows the belts to engage the film between the tube and belts, it is now important that both surfaces of the film have satisfactory hot slip performance. This allows the film to be processed on both the new belt-driven apparatus as well as older equipment.

Silicone oils of the types described in U.S. Pat. No. 4,659,612 have been found to impart satisfactory slip characteristics to oriented polypropylene films. In accordance with the present invention, the outside web of the laminated film includes a thin skin layer (a) (about 2-6 gauge units in thickness) containing an amount of silicone oil sufficient to maintain a low coefficient of friction thereon. The skin layer is a heat seal layer preferably formed from ethylene-propylene random copolymers and/or ethylene-propylene-butene-1 terpolymers.

The latter includes 2-9 wt. % and preferably from about 3-7 wt. % ethylene, and 2-9 wt. % and preferably about three to about seven percent by weight of 1-butene. Suitable polymers generally have a melt flow rate at 446° F. ranging from 1–15 and preferably 2–7. The crystalline melting point is between about 245°–302° F. The average molecular weight range is about 25,000–100,000 and the density is 0.89–0.90. The silicone oil, preferably polydimethylsiloxane, is added in amounts between about 0.3% to about 5.0% by weight of the heat sealable skin layer. The preferred range is between 1.1–1.5 wt. %.

The skin layer (a) is compounded with an effective amount of anti-blocking agent to help maintain a low coefficient of friction. A finely divided, particulate, inorganic material is preferred having a mean particle size ranging from about 0.5 to 5 microns. One commercially available silica has a mean particle size of 0.75 microns and another has a mean particle size of 4.5 microns. Materials having either particle size or particle sizes within this range can be employed. Metal silicates, glasses, clays and numerous other finely comminuted inorganic materials may also be used. The anti-blocking agent is preferably present in amounts from about 0.05 to 0.5 wt. %, preferably about 0.1 to 0.3 wt. % of each of the skin layers.

The core layer (b) of the outside web is preferably derived from isotactic polypropylene which may contain effective amounts of anti-static agents as described in U.S. Pat. No. 4,764,425. The polypropylene homopolymer has melting point range between 321°–325° F.

The polypropylene core layer provides a moisture barrier and stiffness to the outside web. Other possible core materials include oriented high density polyethylene, oriented polystyrene, oriented polyethylene terephthalate, polycarbonate and nylon.

A second skin layer (c) may be provided having a surface which is receptive to ink. This skin layer (c) may comprise the same copolymer and/or terpolymer blend as layer (a), but is subjected to corona, flame, plasma or chemical treatment to impart ink receptivity. This layer may alternatively be omitted and the inner surface of the core layer (b) instead subjected to such treatment.

A primer may be added to the second skin layer depending upon the ink which is to be used thereon. Any of a number of commercially available primers would be suitable for enhancing receptivity to ink and/or adhesive, including poly(ethyleneimine), acrylic styrene copolymers, urethane and epoxy. The application of several such primers is discussed in U.S. Pat. No. 4,565,739, which is incorporated by reference herein. If a primer is employed, virtually any type of ink would be acceptable for application to the core (b) or skin layer (c), whichever is receptive to ink. Since only certain inks adhere to a silicone oil treated film in the absence of a primer, urethane, nitrocellulose, epoxy or polyamide blends should be employed if a primer is not applied. If a urethane adhesive is employed, a water-based ink such as that sold by Crown Zellerbach under the name AQUALAM P, or modified polyamide or nitrocellulose inks or blends thereof, would be satisfactory. If an extrusion (poly) or PVDC adhesive is employed, urethane-nitrocellulose and epoxy-nitrocellulose blends are preferred.

The inside web includes a core layer ($b^1$), a bonding surface layer ($c^1$) for bonding with the adhesive, and an inner, heat sealable inner skin ($a^1$). The skin ($a^1$), core ($b^1$) and bonding surface ($c^1$) layers, respectively, may be comprised of the same materials which are mentioned as suitable for the skin (a), core (b), and second skin (c) layers of the outside web. The skin ($a^1$) of the inside web is substantially devoid of silicone oil, however, which enhances the adhesion of a metallized coating which may be applied to the bonding surface layer ($c^1$). The latter is preferably between about two and seventeen gauge units in thickness. It may contain a slip agent (e.g. 700–3,000 ppm oleamide, stearamide, or erucamide or blends thereof).

While not required, each web is preferably manufactured by employing commercially available systems for coextruding resins. A polypropylene homopolymer of comparatively high stereoregularity is co-extruded with the resins which constitute one or both skin layers thereof. The polymers can be brought into the molten state and co-extruded from a conventional extruder through a flat sheet die, the melt streams being combined in an adapter prior to being extruded from the die. After leaving the die orifice, the multi-layer film structure is chilled and the quenched sheet then preferably reheated and stretched, for example, three to six times in the machine direction and subsequently four to ten times in the transverse direction. The edges of the web can be trimmed and the film wound onto a core.

A metallized coating may be applied to the bonding surface layer ($c^1$) of the inside web using any acceptable method such as that described in U.S. Pat. No. 4,345,005, which is incorporated by reference herein. Other coatings may alternatively be employed depending on the properties desired for the film. A PVDC coating may, for example, be provided to improve the gas and moisture barrier properties of the web.

The inside and outside webs are bonded to each other through the use of commercially available adhesives and conventional bonding processes. The choice of adhesives depends on the properties which one wishes the laminated film to have. A urethane adhesive provides mainly only adhesion. Extruded polymer resins can provide thickness, stiffness and durability. As discussed above, PVDC provides a gas barrier and an additional moisture barrier. If a dry bonding technique is used, the adhesive is applied to one of the webs, the solvent is evaporated out of the adhesive, and the adhesive-coated web is combined with the other web by heat and pressure or pressure only.

Extrusion laminating involves the use of an extruder to melt and continuously apply a controlled amount of a very viscous melted resin, usually polyethylene, directly between the web materials being laminated. The bond is achieved as the melted resin resolidifies in situ. Primers or precoatings may be employed to augment the bond or improve resistance to chemical attack.

Once the outside web has been bonded to the inside web, the resulting laminated film is wound onto a core and maintained in this form for a period of about six hours to one week at a temperature of about 80° to about 125° F. The winding of the film causes the skin layer (a) of the outside web to contact the skin layer ($a^1$) of the inside web. The silicone oil, which is generally substantially uniformly distributed on the exposed surface of skin layer (a), is responsible for imparting a reduced coefficient of friction to this surface as well as to the exposed surface of the inner skin layer ($a^1$) when some of the oil is transferred thereto after these surfaces have been placed in mutual contact. A sufficient amount of silicone oil should be employed to provide a coefficient of friction of layers (a) and ($a^1$), following transfer of silicone oil microglobules to the latter, of about 0.4 or less, preferably 0.25-0.3, up to at least about 60° C.

The thickness of the outside web is primarily due to the thickness of the oriented polypropylene core. The surface layers (a) and (c) may comprise, for example, a total of about eight percent of the total thickness of an 80 gauge web. The total outside web thickness is ordinarily in the range of about 0.35-2.0 mils. The total thicknesses of the inside and outside webs are not critical to the present invention.

The following are specific examples of films which can be manufactured in accordance with this invention.

EXAMPLE 1

A laminated film comprising an outside web having a coextruded abc structure, an inside web having a coextruded $a^1b^1c^1$ structure, and an adhesive bonding the c layer of the outside web to the $c^1$ layer of the inside web is provided.

The "a" layer is an ethylene propylene random copolymer containing about six percent ethylene. This layer is about 2.2 gauge units (0.55 microns) in thickness, is 1.2 wt. percent polydimethylsiloxane, and includes about 2330 ppm $SiO_2$. The "b" layer of the outside web is an isotaotic polypropylene containing about 0.1% N,N bis hydroxyethylamine and is about seventy-five gauge units in thickness. The "c" layer is about three gauge units in thickness, is made from the same copolymer as layer "a", is flame treated and coated with a polyethyleneamine primer.

The $c^1$ layer is made from an isotactic polypropylene homopolymer and contains about 2300 ppm $SiO_2$. It is about three gauge units in thickness and is flame treated. The $b^1$ layer is about seventy-five gauge units in thickness and is made from isotactic polypropylene with no additives. Finally, the $a^1$ layer is fourteen gauge units in thickness (for hermetic sealability) and is formed from an ethylene-propylene random copolymer (about 6% ethylene) containing 2300 ppm $SiO_2$ and a slip agent (e.g. oleamide, stearamide, erucamide and blends thereof).

The urethane adhesive bonds the c layer of the outside web to the $c^1$ layer of the inside web. The laminated film is wound upon a roll whereupon some of the polydimethylsiloxane within the "a" layer is transferred to the $a^1$ layer.

EXAMPLES 2-3

The same film structure as Example 1 is provided except the $a^1$ layer is four and six gauge units, respectively, in thickness.

EXAMPLE 4

The same film structure as Example 1 is provided except the a and $a^1$ layers are both made from EPB-1 random terpolymers containing about 5% ethylene, 8% butene-1 and 87% polypropylene.

EXAMPLE 5

The same film structure as Example 1 is provided except the $c^1$ layer has a metallized (aluminum) coating deposited thereon.

EXAMPLE 6

The same film structure as Example 1 is provided except the "a" layer is formed from a random copolymer containing about 6% butene-1 and 94% polypropylene.

What is claimed is:

1. A method for manufacturing a polymer film laminate comprising:
   providing a first polyolefin web, said first web including a first surface layer containing an anti-blocking agent and a coefficient of friction-reducing amount of silicone oil;
   providing a second polyolefin web, said second web being substantially devoid of silicone oil;
   applying an adhesive between said first and second webs;
   bonding said first web to said second web such that said silicone oil-containing first surface layer of said first web remains exposed; and
   contacting said silicone oil-containing first surface layer of said first web with a first surface layer of said second web, thereby transferring a coefficient of friction-reducing amount of silicone oil thereto.

2. A method as defined in claim 1 wherein said second web includes a metallized second surface layer, said adhesive being applied between said metallized second surface layer of said second web and a second surface layer of said first web.

3. A method as defined in claim 2 wherein said second surface layer of said first web is ink receptive.

4. A method as defined in claim 1 wherein said first surface layer of said first web is heat sealable, said first web including a second surface layer, and said first surface layer of said second web is heat sealable.

5. A method as defined in claim 4 wherein said second surface layer of said first web is ink receptive.

6. A method as defined in claim 4 wherein said first web includes a core layer derived from an isotactic polypropylene.

7. A method as defined in claim 4 wherein said first layer of said first web and said first layer of said second web contain an effective amount of anti-blocking agent for maintaining a low coefficient of friction.

8. A method as defined in claim 7 wherein said silicone oil is polydimethylsiloxane.

9. A method as defined in claim 4 wherein said first web includes a core layer derived from an isotactic polypropylene, said first surface layer of said first web being coextruded with said core layer and being derived from a group consisting of block or random copolymers and/or terpolymers.

10. A method as defined in claim 9 wherein said copolymers are either the same or different random or block copolymers of ethylene and propylene and said terpolymers are either the same or different terpolymers of ethylene, propylene and butene-1.

11. A method as defined in claim 1 including the steps of metallizing a surface layer of said second web and applying said adhesive between said first web and said metallized surface layer of said second web.

12. A method as defined in claim 1 including the step of applying a primer to a second surface layer of said first web and applying said adhesive between said primed second surface layer of said first web and said second web.

13. A method as defined in claim 1 wherein said first surface layer of said first web and said first surface layer of said second web each have a coefficient of friction of less than about 0.4° up to at least about 60° C. subsequent to said step of contacting said first and second webs.

14. A method as defined in claim 4 wherein said first web is coextruded.

15. A method as defined in claim 14 wherein said first surface layer is about 2-6 gauge units in thickness.

* * * * *